Patented Dec. 14, 1926.

1,610,765

UNITED STATES PATENT OFFICE.

EDWARD F. GERMAIN, OF SAGINAW, MICHIGAN, ASSIGNOR TO LOUIS GERMAIN, JR., ALBERT A. GERMAIN, AND JOSEPH HEIDENKAMP, ALL OF PITTSBURGH, PENNSYLVANIA, AND EDWARD F. GERMAIN, OF SAGINAW, MICHIGAN, TRUSTEES.

PROCESS OF PRODUCING ACID-RESISTING AND HEAT-RESISTING ARTICLES.

No Drawing.     Application filed September 6, 1924. Serial No. 736,368.

This invention has for its objects the obtaining of a material mass having certain advantageous properties adapting it for use in the manufacture of battery containers, boxes and articles of like nature.

Such articles when in use are usually subjected to shaking or vibration, especially the battery boxes of motor vehicles. Therefore, they must withstand rough usage. They are frequently located near exhaust pipes or other hot surfaces and consequently must be capable of withstanding high degrees of heat.

Battery boxes also require to be non-conductors of electricity and should have considerable elasticity and flexibility to prevent cracking. The mass must also have the property of being practically self-lubricating so as not to stick to the molds. This self-lubricating property is also of advantage in producing a smooth finished surface on the completed article.

With the foregoing and certain other objects in view which will appear later in the specifications my improved composition of matter consists in the following ingredients combined in substantially the quantities specified and mixed under the conditions and in the manner substantially as set forth.

In carrying out the commercial manufacture of articles made of my composition I first take approximately three pounds of mineral rubber or elastic mineral resin and one pound of gilsonite or other equivalent bituminous material of relatively high melting point. These materials are ground and mixed and then heated until liquefied. To this hot liquid I add approximately one-half pound asbestos preferably in the form of fibre, although it may be used in more comminuted form, plus approximately three pounds of infusorial silica such as kieselguhr, which is sometimes known in the market as silocel, plus one pound finely ground hydrous aluminum silicate, such as clay.

The foregoing quantities are substantially those required to produce a standard size battery box. Approximately the same proportions are used in producing articles of different sizes. The specified proportions expressed in percentage are as follows: Mineral rubber thirty five per cent, gilsonite twelve per cent, asbestos fibre six per cent, kieselguhr thirty five per cent, clay twelve per cent.

The above ingredients are then mixed at a temperature sufficiently high to keep the mass in gummy plastic form. When thoroughly mixed so that the filler material, namely, the kieselguhr and clay and the fibrous asbestos are completely covered as to their individual particles with the binder, namely, the melted mineral rubber and gilsonite, the hot mass is ready to be fabricated.

In the example above stated the mass consists of a total of about eight and one half pounds of material. This is placed in a mold and subjected to hydraulic pressure sufficient to crowd the individual particles closely together and produce a homogeneous compact structure.

Gilsonite or other bituminous material, such as asphalt having a high melting point when mixed with the mineral rubber has an unusually high degree of flexibility. Tensile strength and acid resistance are also among its characteristics and by this mixture the highest possible melting point consistent with effective mixture and tensile strength is attained.

The kieselguhr which is preferably very finely ground, serves the purpose of a filler to occupy the minute holes that are in the mass before it is completely solidified by pressure. Kieselguhr is also heat resistant. It assists in prolonging the life of the completed article and increases the melting point so as to render the article more durable when used in a place subjected to high temperatures.

The fibrous asbestos and in some cases finely ground asbestos serves as a binder to further increase the tensile strength of the completed mass. It is not affected by heat or acid. The clay acts as a lubricant in the mold or form of the press. When subjected to high pressure it prevents the finished article from sticking to the mold and makes a smoother finished surface than is otherwise obtainable. The clay also, along with the kieselguhr, fills the minute holes in the completed product and produces a thoroughly homogeneous material.

By the means above described I have produced a mass which is easily and cheaply manufactured, is readily molded under pressure and produces a finished article that is highly resistant to the action of acid and heat, and is practically unbreakable under the conditions of ordinary use.

While I have described my improved composition of matter and its method of manufacture with reference to the specific weighed quantities of the various ingredients which I ordinarily employ in the manufacture of battery boxes of standard size, yet it will be understood that the specifications given are solely for the purpose of enabling others skilled in the art to successfully produce the desired material without experimenting. I do not, however, desire to be understood as confining my invention to the exact quantities specified, nor to the exact named ingredients, because other quantities and other ingredients having the same physical characteristics may be substituted without departing from my invention herein described and set forth in the claim.

Having thus described my invention, what I claim and desire to secure by Letters Patent is:

The process of producing acid-resisting and heat-resisting articles having a material degree of elasticity and self lubricating molding properties which consist in mixing and melting a binder comprising substantially thirty five per cent by weight elastic mineral resin, twelve per cent gilsonite, and grinding said materials and melting them together, mixing with said melted material a filler consisting of substantially six per cent asbestos fibre, thirty five per cent infusorial silica and twelve per cent comminuted clay, working the resultant mixture to form a homogeneous plastic mass, and molding said mass under pressure while hot.

In testimony whereof, I affix my signature.

EDWARD F. GERMAIN.